Dec. 29, 1936.   P. RIME-BRUNEAU   2,065,648
CONTROLLING DEVICE FOR ROTATING SHAFTS
Filed Nov. 3, 1934

P. Rime-Bruneau
INVENTOR

By: Glascock Downing Seebold
Attys.

Patented Dec. 29, 1936

2,065,648

UNITED STATES PATENT OFFICE 2,065,648

CONTROLLING DEVICE FOR ROTATING SHAFTS

Paul Rime-Bruneau, Paris, France, assignor to the firm Societe D'Exploitation Des Procedes Dabeg, Paris, France Application November 3, 1934, Serial No. 751,389
In France November 7, 1933

3 Claims. (Cl. 64—31)

My invention relates to the control of rotating shafts and more particularly of shafts which are subjected to oscillations of level or to displacements.

In some motive power plants, as it is the case for instance for steam locomotives, oscillations of level or relative displacements may take place between the controlling parts and the controlled members, and it is in such conditions necessary to provide a connection which allows said relative movements to take place without any drawback for the operation of the whole plant.

Such a connection has sometimes been effected by means of a member which receives between two slide bars a conveniently flattened end of the controlled shaft, said controlled shaft still being however at a leisure of displacing itself in a direction parallel to the plan of flattened parts, said member being, on another hand, provided with flattened arms, the direction of which is at right angles with above mentioned slide bars and being located with a possibility of relative displacement in a direction parallel to their own plan and slide bars which pertain to a member which latter is, either directly or not, connected with the motor shaft.

Such an arrangement is however connected with the drawback that, more particularly when the controlled shaft remains for a time set over relatively to the motor shaft, said controlled shaft then performs a complex movement giving way to inertia strains which could cause vibrations and injuries of the mechanism to take place.

The device according to my invention, which remedies above drawbacks, comprises the combination with the motor member and the controlled shaft, two or a larger number of conveniently displaced transmission members, with a view to secure the dynamic balance of the inertia strains caused by said individual parts, thus allowing a continuous operation practically free of shocks or vibrations.

In the accompanying drawing which shows by way of example only a preferred embodiment of the device according to my invention:—

Figure 1:
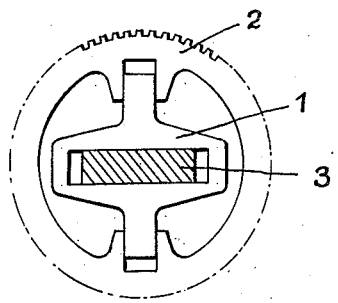
Figure 2:
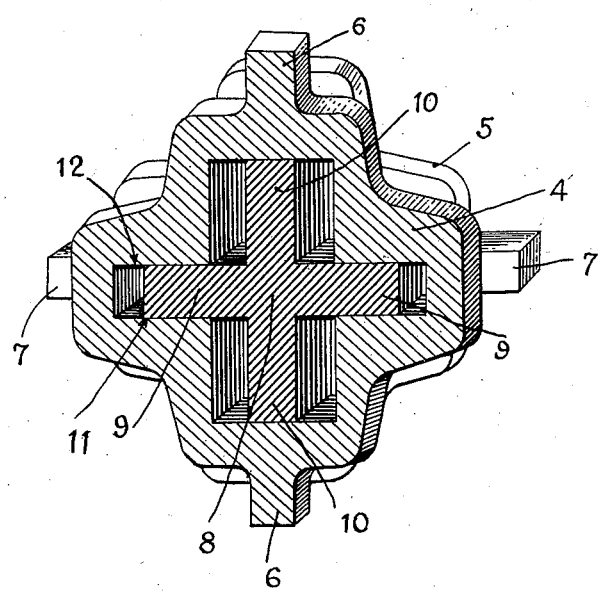

Fig. 1 is a diagrammatic view of a known constructional form of a controlling member of such kind, Fig. 2 is a diagrammatic cross section of an embodiment according to my invention which is to be applied to a locomotive axle, the motor member being not shown.

In the constructional form of a known device shown in Fig. 1, the intermediate part or member 1, which is controlled by a toothed wheel 2, effects from the kinematic point of view a convenient connection between the motor part 2 and the controlled shaft 3, whatever may be the relative displacements or oscillations of level of said shaft 3.

From the dynamic point of view, on the contrary, said connecting part or movable cage 1 is connected with the drawback that it performs a complex movement when the controlled shaft 3 remains for a time set over the motor member 2. Independently of the general rotating movement of the whole unit, the geometrical center of the movable cage 1 is displaced along a circle, the diameter of which is the eccentricity of shaft 3, said circle being followed with a speed of rotation which is double of that of the controlled shaft 3.

Owing to the weight of the movable cage 1 and to the rotating speed of the unit, this results in inertia strains of the same kind as those which would be caused by a want of balance, and said strains could cause vibrations and injuries of the whole device.

According to my invention and as shown in Fig. 2, the connecting device comprises two cages 4, 5, having the same mass, and dephased of 90° relatively to each other, cage 4 receiving through geometrically opposed members 6 its rotating movement from controlling members similar with the toothed wheel 2 of Fig. 1, which also rotates in second cage 5 through parts 7, the direction of which is at right angles with the direction of parts 6.

Cages 4, 5, are located on a common axle 8, the cross section of which has a shape of a cross with two flat parts 9, 10, at right angle directions.

Cage 4, which has been hatched in Fig. 2, in order to render the drawing clearer, keeps between its flat surfaces 11, 12, the flat part 9 of the axle, allowing said part to slide along surfaces 11, 12. The cross formed by the axle 8 is also seized through its part 10 in cage 5.

It is thus seen that, thanks to such an arrangement, both cages are dephased at 90° or a quarter of a revolution and, owing to the fact that, on another hand, their centers describe the eccentering circle at a double angular speed, the relative displacement of said centers is 180° or half of a revolution and consequently the corresponding masses are balanced at any time.

Cages 4, 5, may have any desired relative arrangement. It is namely possible, when it is desired to secure in a perfect manner the compensation of the inertia strains in any direction, to locate one of the cages 4, 5, into the other in order to bring their centers of gravity into the same plan at right angles with shaft 8.

It is of course possible to anticipate the simultaneous use of a larger number of cages, three for instance, which would then be displaced at 120° relatively to one another. In that event, the cages could of course be also located one inside the other.

My invention applies for the transmission of motive powers of any kind, for any use, in all cases when one or several relative movements are in a position to take place between the motive member and the controlled member and more especially for the control of locomotive wheels.

What I claim is:—

1. In a device for controlling shafts subjected to oscillations of level or displacements, the combination of a controlled axle or shaft having a cross shaped cross section receiving two movable cages displaced relatively to each other of 90°.

2. In a device for controlling shafts subjected to oscillations or displacements, a profiled shaft provided with longitudinal wings or ribs, a number of movable transmission members displaced relatively to one another substantially 90 degrees, said transmission members having each a sliding connection with some of the longitudinal wings or ribs of the shaft, said wings or ribs being displaced to correspond with the several transmission members with which they engage with a view of securing the dynamical balance of inertia strains caused by said individual parts, thus allowing a continued operation practically devoid of shocks or trepidations.

3. In a device for controlling shafts subjected to oscillations or displacements, a driving shaft provided with any desired number of longitudinal ribs at equal angular distances, cages located on said shaft and correspondingly displaced with one another, said cages being in a sliding connection with some of said ribs or wings of said shaft, while other cages are in a sliding connection with ribs, wings or arms of said driving shaft different from those first mentioned, thus securing the operation of the several cages in spite of the denivellations or displacements of said members.

PAUL RIME-BRUNEAU.